Figure 1:
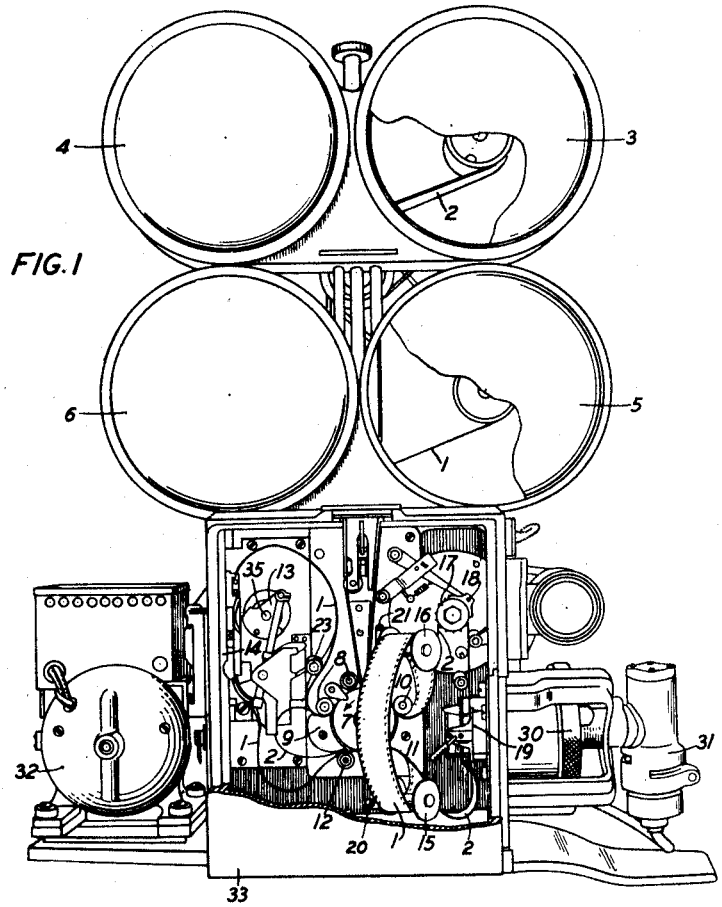

May 8, 1934.    E. G. BROWN ET AL    1,957,525
CAMERA
Filed Sept. 9, 1932

INVENTORS: E.G. BROWN
J.G. FRAYNE
BY
G.H. Heydt.
ATTORNEY

Patented May 8, 1934

1,957,525

UNITED STATES PATENT OFFICE 1,957,525

CAMERA

Elmer G. Brown, Los Angeles, and John G. Frayne, Pasadena, Calif., assignors to Electrical Research Products Inc., New York, N. Y., a corporation of Delaware Application September 9, 1932, Serial No. 632,304

2 Claims. (Cl. 88—16.2)

This invention relates to cameras or portable recording devices arranged for recording pictures and accompanying sound in a single unit.

It has been found desirable and necessary under certain conditions, as in color photography, to record motion pictures and accompanying sound on separate films. These films may thus be separately developed and individually treated according to the results desired before the master film is printed therefrom. This has not seemed practical for newsreel motion picture work since the portable cameras in general use are limited in size. The practice in newsreel work has thus been to record both the pictures and sound on a single film.

In accordance with the present invention, however, a camera or portable single-unit picture and sound recording device is arranged for guiding separate motion picture and sound films through respective picture and sound recording units.

In accordance with one embodiment of the invention, two takeup reels and two delivery reels are mounted at the top of the camera. The camera is arranged for the delivery of both films adjacent to each other from the delivery reels to what is generally known as the hold-back sprocket. These films are taken through a quarter sector of the hold-back sprocket where the picture film is diverted in order to be carried by the intermittent motion past the camera lenses for recording the pictures. A loop is formed in the sound film and the two films are again brought together after the picture film has passed the picture lenses. The two films are carried through the under quarter segment of the hold-back sprocket toward the camera wall having the sound recording unit therein. At this point the films are separated, the sound film being guided toward the sound recording unit and the picture film formed into a loop. The sound film is driven at constant velocity through the sound recording unit by a cylinder or sprocket. During the travel of the sound film through the sound recording unit, the picture film is formed into a complete spiral loop in order that the surfaces thereof be in the proper position for winding. This loop is formed over guide rollers placed below and above the guiding or hold-back sprocket. After the sound film has passed through the sound recording unit and the picture film through the spiral loop they are brought together and are taken through the right upper quarter segment of the hold-back sprocket from which they are delivered to individual takeup reels.

In the foregoing arrangement for guiding separate films through a camera, only a small amount of weight has been added. This weight comprises the extra film and reels plus the small guide rollers. The devices associated with the hold-back sprocket for guiding the films in separate paths do not constitute any additional weight.

Figure 2:
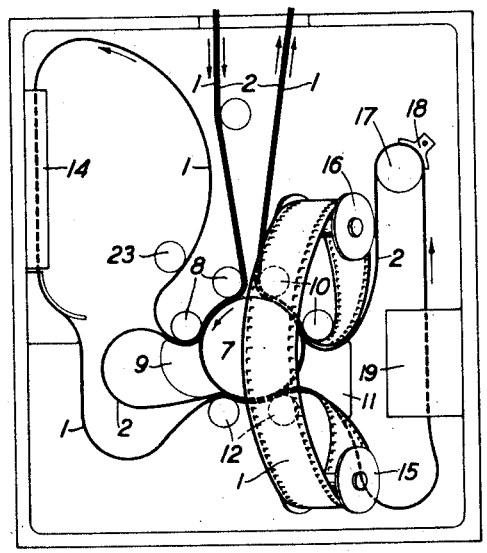

In the illustrated embodiment, Fig. 1 discloses a camera arranged for driving individual picture and sound films according to the invention and Fig. 2 illustrates the path of the films in diagrammatic form.

Two delivery reels 4 and 6 and two take-up reels 3 and 5 are shown for the picture film 1 and the sound film 2. A rectangular shaped camera 33 is shown having a picture recording unit on one wall and a sound recording unit on the opposite wall. The picture recording unit comprises a lens and shutter unit with associated operating mechanism including a device for intermittently moving the film for photographic exposure. The sound recording unit comprises a lamp supported in the encasement 31, a light valve unit supported in the encasement 30 and sound film gate 19. The motor 32 is arranged to synchronously operate the apparatus of the camera. This apparatus may be synchronously operated as shown in application Serial No. 425,932, filed February 5, 1930 by L. M. Potts and issued as Patent 1,882,893 dated Oct. 18, 1932, in which the motor is belt connected to a flywheel. The flywheel may be rigidly mounted on shaft 35 of the present disclosure for operating the intermittent motion 13 and for operating a set of gears for driving the sprockets 7 and 17 in the manner shown in the illustrated embodiment of the above application. The light valve method of recording has been illustrated for convenience, but it will be understood that any other method of securing a photographic record of sound may be used. The light valve in the encasement 30 may be of the type shown in Patent 1,636,555, issued to E. C. Wente, August 9, 1927.

The picture film 1 is delivered to the camera from reel 6 with the sound film 2 which is delivered to the camera from reel 4. Both films 1 and 2 are guided together by rollers 8 over the film driving sprocket 7. The teeth of the sprocket 7 are designed to drive two films, one above the other. The guide rollers associated with this sprocket are also made and adjusted for two thicknesses of film. A guide block 9 is so shaped that both films are turned away from the sprocket 7 below the lower roller 8. The picture film 1 is guided by roller 23 in an upward direction where it forms a loop before being taken downward by the intermittent motion 13 past the lens aperture gate 14. The sound film 2 after passing over guide block 9 is formed into a loop and rejoins the picture film after it is guided away from the lens aperture gate 14. The two films are driven together by sprocket 7 and guided by rollers 12 toward the wall of the camera having the sound recording unit thereon, whereupon they are again separated in order that the sound film may be driven past the sound recording apparatus. The guide block 11 is so shaped as to guide both films away from the sprocket 7 and start them in directions for separate routings. The sound film 2 is formed into a loop and drawn at constant velocity past the sound recording apparatus by sprocket 17 having an associated guide block 18 which is tensioned by springs toward the sprocket. The picture film 1 after leaving the guide block 11 is formed into a complete spiral loop in order to retain the film surfaces in the correct relation for winding on the takeup reel. During the movement of the sound film 2 through the sound recording apparatus the picture film 1 is thus taken in a spiral over guide rollers 15 and 16 which rollers are placed at such angle as to guide the film in said spiral to a point below the lower guide roller 10 associated with sprocket 7. The two films are again brought together above the guide block 11 which, in combination with the lower guide roller 10, guides the films to sprocket 7. Guide rollers 10 retain the films in contact with the right upper quarter segment of sprocket 7 from which the films are delivered to separate reels. The picture film 1 is wound upon takeup reel 5 and the sound film 2 upon takeup reel 3.

It will be apparent from the foregoing that the sprocket 7 which is arranged for driving two thicknesses of film, serves three distinct driving functions. One segment is arranged for the withdrawal of both films from the delivery reels, a lower segment is arranged for driving both films from the picture recording side of the camera to the sound recording side and a third segment is arranged to drive both films toward the takeup reels. The curvature of the guide blocks 9 and 11 is such as to permit the guidance of two thicknesses of film toward the required routes.

What is claimed is:

1. Film feeding mechanism for a camera having a picture recording unit and a sound recording unit mounted therein arranged to synchronously record motion pictures on one film strip and the accompanying sound on another film strip, reels for said films, a single sprocket arranged to govern the withdrawal of both films from the delivery reels and the feeding of both films to takeup reels, means associated with said sprocket arranged to guide said films over three different sectors of such sprocket in superposed relation, and away from said sprocket in separated relation between the first and second sectors, and between the second and third sectors for successively guiding the picture film to the picture recording unit and the sound film to the sound recording unit, and means comprising a pair of guide rollers set at such angle as to cause the picture film to curve away into a complete spiral loop in approximately the opposite direction from the loop of the sound film as it passes through the sound recording unit.

2. Film feeding mechanism for a camera having a picture recording unit on one wall and a sound recording unit on the opposite wall arranged to synchronously record motion pictures on one film strip and the accompanying sounds on another film strip, reels for said films, a sprocket, means associated with said sprocket for guiding both films in superposed relation over a sector of said sprocket for withdrawing said films from the delivery reels, means for guiding the picture film to the picture recording unit and the sound film into a compensating loop, means associated with said sprocket for guiding both films in superposed relation over a second sector of said sprocket for driving the films toward the sound recording unit, means for guiding the sound film through the recording unit, means comprising a pair of guide rollers set at such angle as to cause the picture film to curve away into a complete spiral loop in approximately opposite direction from the sound film, said spiral loop being arranged to occupy a minimum space in the camera interior, and means associated with said sprocket for guiding both films in superposed relation over a third sector of said sprocket for feeding said films to the takeup reels.

ELMER G. BROWN.
JOHN G. FRAYNE.